United States Patent
Vos et al.

(10) Patent No.: US 9,681,256 B2
(45) Date of Patent: Jun. 13, 2017

(54) ABBREVIATED BLIND DETECTION IN WIRELESS COMMUNICATION SYSTEMS INCLUDING LTE

(71) Applicant: Sierra Wireless, Inc., Richmond (CA)

(72) Inventors: Gustav Gerald Vos, Surrey (CA); Naveen Mysore Balasubramanya, Vancouver (CA); Lutz Hans-Joachim Lampe, Vancouver (CA); Steven John Bennett, Coquitlam (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 308 days.

(21) Appl. No.: 14/214,739

(22) Filed: Mar. 15, 2014

(65) Prior Publication Data

US 2015/0264665 A1 Sep. 17, 2015

(51) Int. Cl.
H04W 4/00 (2009.01)
H04L 5/00 (2006.01)

(52) U.S. Cl.
CPC .............. H04W 4/005 (2013.01); H04L 5/00 (2013.01); H04L 5/0053 (2013.01); H04L 5/0007 (2013.01)

(58) Field of Classification Search
CPC ................................. H04L 5/00; H04W 4/005
USPC .......... 370/335–337, 342–345; 375/260–265
See application file for complete search history.

(56) References Cited

U.S. PATENT DOCUMENTS

| | | | |
|---|---|---|---|
| 8,494,454 B2 | 7/2013 | McBeath et al. | |
| 2013/0044692 A1* | 2/2013 | Nory | H04L 25/0228 370/329 |
| 2013/0058218 A1* | 3/2013 | Wu | H04W 74/0816 370/241 |
| 2013/0058240 A1 | 3/2013 | Kim et al. | |
| 2013/0170523 A1 | 7/2013 | Vermani et al. | |
| 2014/0119253 A1* | 5/2014 | Weng | H04W 72/042 370/311 |

(Continued)

FOREIGN PATENT DOCUMENTS

WO WO-2013-009089 A2 1/2013

OTHER PUBLICATIONS

International Search Report and Written Opinion dated Jul. 13, 2015 in International Application No. PCT/CA2015/050177 filed Sep. 3, 2015.

(Continued)

*Primary Examiner* — Thai Hoang
(74) *Attorney, Agent, or Firm* — Saliwanchik, Lloyd & Eisenschenk (57) ABSTRACT

A method and apparatus are provided for abbreviating the blind decoding process performed by a UE, such as an LTE UE, on control channel data such as PDCCH data of PRB pairs of a set of PRB pairs transmitted concurrently within a subframe. In some embodiments, only a prioritized portion of the PDCCH data is decoded, thereby expediting blind decoding. In some embodiments, a reduced number of encoding options for the PDCCH data is used, and blind decoding is expedited by considering only such options as possibilities. When blind decoding of the PDCCH data is completed before the end of the subframe, this may be used to identify and discard corresponding PDSCH data which is irrelevant to the UE. The prioritized portion may be adjusted as needed to include the CSS so as not to miss certain critical data.

23 Claims, 5 Drawing Sheets

(56) References Cited

U.S. PATENT DOCUMENTS

| | | | | |
|---|---|---|---|---|
| 2014/0133427 A1* | 5/2014 | Kim | ...................... | H04L 5/0053 370/329 |
| 2014/0233663 A1* | 8/2014 | Kang | .................... | H04L 5/0037 375/260 |
| 2014/0293942 A1* | 10/2014 | Kang | .................... | H04L 5/0053 370/329 |
| 2016/0036569 A1* | 2/2016 | Kim | ........................ | H04J 11/00 370/342 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) Procedures in Idle Mode (Release 11)," V11.6.0, Dec. 2013.

3GPP TS 36.331, "3rd Generation Partnership Project; Technical Specification Group Radio Access Network; Evolved Universal Terrestrial Radio Access (E-UTRA); Radio Resource Control (RRC); Protocol Specification (Release 12)," V12.0.0, Dec. 2013.

3GPP TS 36.213, "3rd Generation Partnership Project; Technical Specification Group Radio Access Network; Evolved Universal Terrestrial Radio Access (E-UTRA); Physical Layer Procedures (Release 12)," V12.0.0, Dec. 2013.

"PDCCH monitoring set," 2009, *3GPP TSG RAM Samsung—3GPP TSG RAN WG1 Meeting #59, R1-094571*, Jeju, Korea, Nov. 9-13, 2009.

Stefania Sesia et al., "PDCCH transmission and blind decoding," LTE: The UMTS Long Term Evolution—From Theory to Practice, Section 9.3.5.5, Aug. 2011, pp. 211-212, Second Edition, Wiley.

"LTE Frame Structure and Resource Block Architecture," Teletopix. org, Jan. 28, 2013, pp. 1-3, http://www.teletopix.org/4g-lte/lte-frame-structure-and-resource-block-architecture/.

Dornal, "EMM, ECM, RRC States, TAU and Handovers," Wired n Wireless, Apr. 21, 2010, pp. 1-5, http://wired-n-wireless.blogspot.ca/2010/04/emm-ecm-rrc-states-tau-and-handovers.html.

* cited by examiner

ABBREVIATED BLIND DETECTION IN WIRELESS COMMUNICATION SYSTEMS INCLUDING LTE

FIELD OF THE INVENTION

The present invention pertains in general to wireless communication systems such as LTE systems and in particular to methods and apparatus for supporting downlink communication including blind detection by terminal devices.

BACKGROUND

The Long Term Evolution (LTE) wireless communication standard maintained by the $3^{rd}$ Generation Partnership Project (3GPP) is a leading standard for use in cellular-type wireless communication systems, between evolved NodeB (eNB) base stations and User Equipment (UE). Wireless communication for LTE, such as downlink communication from eNB to UE, is organized into Physical Resource Blocks (PRB) in time and frequency. An LTE system can be implemented with one of a range of bandwidths and current standards allow for transmission of between 6 and 110 PRBs pairs per 1 ms subframe. A PRB pair as used herein refers to a pair of PRBs located in time-adjacent 0.5 ms time slots of a subframe. A typical PRB pair transmitted on the downlink contains pilot signals, control information of the Physical Downlink Control Channel (PDCCH) and shared payload information of the Physical Downlink Shared Channel (PDSCH). In various implementations, the PDCCH can occupy up to four of the nominally fourteen symbol intervals of a given PRB pair. PDCCH information is received first and indicates to the UEs where they may find data within the PDSCH field following.

In practice the decoding of the PDCCH can take a significant amount of the time during which the PDSCH is being received. All of the PDSCH symbols in a subframe are therefore typically buffered in memory before de-interleaving can occur, and it is therefore acceptable for the PDSCH decoding to take all for the subframe. Legacy UEs may need to buffer up to a full set of up to 110 PRB pairs due to having large amounts of data to receive. This results in a relatively large buffer memory requirement and added expense for such UEs.

Currently, various solutions are being sought for providing for lower cost or limited capability (LC) UEs to operate within the LTE standard. These UEs may be intended for specific applications such as Machine-Type Communication (MTC) or Machine-to-Machine (M2M) applications. Such devices may be delay tolerant and may not require access to high data rates. Introduction of standards changes in order to accommodate the new category of UEs is possible. However, it is desirable that any such changes should be relatively easy to implement and should not adversely affect current levels of performance or system efficiency for legacy categories of UEs.

One proposed feature of LC UEs is that they may only support a limited number of shared downlink channel (PDSCH) Physical Resource Block (PRB) pairs (e.g. 6 or 15 PRB pairs) per subframe while still allowing use of the legacy downlink control channel (PDCCH) assignment mechanism. Such LC UEs would still be able to receive PDCCH information that may be contained in any PRBs across the full system bandwidth, but would only need to receive for example 6 PRB pairs per subframe of PDSCH. The PRBs designated for a LC UE do not have to be contiguous but may be distributed across the system bandwidth. This may provide a cost reduction for example by allowing for a possible reduction in post FFT buffer memory size for the LC UEs.

However, since the limited number of PRB pairs allocated for use by LC UEs is not generally known a priori, and since decoding of the PDCCH may take a significant amount of time, the LC UE is still generally required to buffer all PRB pairs. This represents a waste of resources since the majority of buffered data is unused by the LC UE.

Therefore there is a need for a method and apparatus for supporting downlink communication including blind detection by UEs, such as LC UEs, that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for supporting downlink communication including blind detection by UEs. In accordance with an aspect of the present invention, there is provided a method of supporting downlink communication in an LTE wireless communication system, comprising: wirelessly receiving a set of Physical Resource Block (PRB) pairs at a UE, each PRB pair of the set of PRB pairs comprising PDCCH data followed by PDSCH data, each PRB pair of the set of PRB pairs having been transmitted concurrently within a subframe; concurrently with receipt of said set of PRB pairs, performing blind decoding of a prioritized portion of the PDCCH data of PRB pairs of the set of PRB pairs, wherein said blind decoding is completed prior to expiry of the subframe; and for at least some PRB pairs for which the decoded PDCCH data thereof is indicative that the PDSCH data of the same subframe is devoid of data intended for the UE, refraining from one or both of buffering and decoding of at least some of said PDSCH data.

In accordance with another aspect of the present invention, there is provided a wireless terminal device configured for communication in an LTE wireless communication system, comprising: a receiver module configured to wirelessly receive, from a base station, a set of Physical Resource Block (PRB) pairs, each PRB pair of the set of PRB pairs comprising PDCCH data followed by PDSCH data, each PRB pair of the set of PRB pairs having been transmitted concurrently within a subframe; a prioritization module configured to select a prioritized portion of the PDCCH data of PRB pairs of the set of PRB pairs; a blind decoding module configured, concurrently with receipt of said set of PRB pairs, to perform blind decoding of the prioritized portion of the PDCCH data of PRB pairs of the set of PRB pairs, wherein said blind decoding is completed prior to expiry of the subframe; and a buffer control module configured, for at least some PRB pairs for which the decoded PDCCH data thereof is indicative that the PDSCH data of the same subframe is devoid of data intended for the UE, to inhibit one or both of buffering and decoding of at least some of said PDSCH data.

In accordance with an aspect of the present invention, there is provided a method of supporting downlink communication in an LTE wireless communication system, comprising: wirelessly transmitting, by a eNB, a set of Physical Resource Block (PRB) pairs for receipt by a relatively reduced capability UE, each PRB pair of the set of PRB pairs comprising PDCCH data followed by PDSCH data, each PRB pair of the set of PRB pairs transmitted concurrently within a subframe, wherein at least a portion of the PDCCH data is encoded utilizing a reduced set of encoding options relative to a full set of encoding options available for use in communication with relatively higher capability UEs; wherein the UE is configured to perform blind decoding of at least a portion of the PDCCH data of PRB pairs in the set of PRB pairs, wherein said blind decoding is limited to a reduced set of decoding options which is complementary to the reduced set of encoding options.

In accordance with an aspect of the present invention, there is provided a base station configured for communication in an LTE wireless communication system, comprising: an identification module configured to identify a reduced capability UE in communication with the base station; an encoding control module configured to select a reduced set of encoding options relative to a full set of encoding options available for use in communication with relatively higher capability UEs; a communication module configured to encode a set of Physical Resource Block (PRB) pairs for wireless transmission by the base station for receipt by the reduced capability UE, each PRB pair of the set of PRB pairs comprising PDCCH data followed by PDSCH data, each PRB pair of the set of PRB pairs transmitted concurrently within a subframe, wherein at least a portion of the PDCCH data is encoded utilizing the reduced set of encoding options; wherein the UE is configured to perform blind decoding of at least a portion of the PDCCH data of PRB pairs in the set of PRB pairs, wherein said blind decoding is limited to a reduced set of decoding options which is complementary to the reduced set of encoding options.

In accordance with an aspect of the present invention, there is provided a wireless terminal device configured for communication in an LTE wireless communication system, comprising: a blind decoding module configured to perform blind decoding of at least a portion of PDCCH data of Physical Resource Block (PRB) pairs of a set of PRB pairs received from a base station, each PRB pair of the set of PRB pairs comprising said PDCCH data followed by PDSCH data, each PRB pair of the set of PRB pairs transmitted concurrently within a subframe, wherein said blind decoding is limited to a reduced set of decoding options; wherein at least a portion of the PDCCH data is encoded by the base station utilizing a reduced set of encoding options relative to a full set of encoding options available for use in communication with relatively higher capability UEs; and wherein the reduced set of decoding options is complementary to the reduced set of encoding options.

In accordance with an aspect of the present invention, there is provided a computer program product comprising a non-transitory computer readable medium comprising code that, when executed by a computer, is adapted to perform one or more of the above methods.

In accordance with other aspects of the present invention, there is provided a method, apparatus and/or computer program product for supporting downlink communication in an LTE wireless communication system, the method comprising: notifying a eNB, by a UE via wireless communication, of one or more subframes during which the UE will be unreceptive of data scheduled via USS due to lack of monitoring of USS portions of PDCCH data of said one or more subframes; and refraining, by the eNB, from scheduling data transmission via USS during the one or more subframes, the apparatus and computer program product similarly operable.

BRIEF DESCRIPTION OF THE FIGURES

These and other features of the invention will become more apparent in the following detailed description in which reference is made to the appended drawings.

DETAILED DESCRIPTION OF THE INVENTION

Definitions

The term "buffer" or "buffer memory" as used herein may refer to a sufficiently high-speed volatile memory which may be used at least for storing data conveyed by the PDCCH and/or PDSCH. Suitable memory technologies will be readily understood by a worker skilled in the art.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Although the LTE standard and various aspects thereof are used herein for describing the present invention, it is noted that the present invention may be applicable to similarly functioning wireless communication systems, such as future revisions of the LTE standard or next-generation wireless communication systems. The term "LTE system" may therefore encompass such systems.

Aspects of the present invention provide methods and apparatus for abbreviating the blind decoding process performed by a UE, such as an LTE UE, on control channel data such as PDCCH data of PRB pairs of a set of PRB pairs transmitted concurrently within a given subframe. In various embodiments, particularly on the downlink, a PRB may be viewed as similar or identical to a Resource Block (RB), according to some definitions as would be understood by a worker skilled in the art.

In some embodiments, a prioritized portion of the PDCCH data is selected and blind decoding is performed on the prioritized portion. Some or all of the remainder of the PDCCH data is not subjected to blind decoding, thereby abbreviating the blind decoding process at the cost of potentially missing scheduling information pertaining to broadcast or unicast data intended for the UE, and hence missing reception of the data itself. In some embodiments, the prioritized portion corresponds to a strict subset of a portion of the PDCCH data comprising both the User Search Space (USS) portion and the Common Search Space (CSS) portion. For example, the prioritized portion may correspond to the entire USS portion or the entire CSS portion. In various embodiments, the prioritized portion may be adjusted over time, for example on a subframe-by-subframe basis, in order to capture data required by the UE.

In some embodiments, at least a portion of the PDCCH data, for example for reception by a LC UE, is encoded using a reduced set of encoding options, relative to the full set of encoding options available for use in communication with relatively higher capability UEs, legacy UEs, or the like. The UE is then configured to perform blind decoding of the PDCCH data using a reduced set of decoding options which is complementary to the reduced set of encoding options. In various embodiments, the portion of the PDCCH data is a USS portion associated with the UE.

In some embodiments, the reduced set of encoding options is defined by a reduced set of candidates for the User Search Space (USS), relative to a full set of candidates for the USS available for use in communication with the relatively higher capability UEs. In some embodiments, the reduced set of encoding options is defined by a reduced set of DCI formats for the User Search Space (USS), relative to a full set of DCI formats for the USS available for use in communication with the relatively higher capability UEs. In some embodiments, the reduced set of encoding options is defined by both of the above.

In various embodiments, the reduced set of decoding options is complementary to the reduced set of encoding options in the sense that blind decoding attempts are limited to those that would potentially successfully decode data encoded under the reduced set of encoding options. In general, techniques for performing blind decoding operations on data encoded using an unknown option selected from a known group of potential options would be readily understood by a worker skilled in the art.

Further aspects of the present invention provide methods and apparatus for leveraging the aforesaid abbreviated blind decoding so as to complete blind decoding of PDCCH data prior to expiry of the subframe which contains that PDCCH data. Subsequent to completion of the blind decoding, the UE may refrain from further buffering and/or processing of PDSCH data for some or all PRB pairs. Namely, where the decoded PDCCH data indicates that the PDSCH data of a given PRB pair is devoid of data intended for the UE, buffering and/or processing of that PRB pair can be abandoned. This may allow, for example, for a reduction in buffer memory and/or computational requirements of a LC UE implementing the present technology. This in turn may allow for a cost reduction for such classes of UEs, particularly lower cost M2M UEs.

It is noted that various aspects of the present invention relate to accommodating LC UEs as a sub-population within an LTE system. The LTE system generally comprises other classes of UEs, such as legacy UEs, full-functionality UEs, and the like and is required to provide full service to such UEs. LC UEs may include M2M UEs such as those installed in smart meters, tracking devices, remote sensors, and the like.

It is noted that different aspects and embodiments as described herein may be combined with each other for greater effect. For example, performing blind decoding on a prioritized portion of the PDCCH data and encoding the PDCCH data using a reduced set of decoding options, may be combined in order to further abbreviate the blind decoding process relative to the case where either embodiment is used on its own. Furthermore, use of a reduced set of candidates for the USS may be combined with use of a reduced set of DCI formats.

In a system with wide bandwidth, there may be many PDCCH elements to decode. The LTE standards define resource allocations for PDCCH messages that are more limited. This reduces the search space within the PDCCH field that UEs are meant to decode. The PDCCH can contain information broadcast to all UEs in Common Search Space (CSS) and information directed to specific UEs in User Search Space (USS). The potentially relevant CSS and USS PDCCH content is typically buffered because the UE needs time to decode the CSS and USS information by blind decoding several possible transmission formats.

Blind Decoding of Prioritized Portion

In various embodiments, a LC UE is configured to decode a prioritized portion of the PDCCH data conveyed by PRB pairs of a set of PRB pairs transmitted concurrently within a subframe. The prioritized portion may be a strict subset of a combination of: the USS portion of the PDCCH data and the CSS portion of the same PDCCH data. In some embodiments, the prioritized portion may correspond to one of: the USS portion of the PDCCH data; and the CSS portion of the PDCCH data. That is, the LC UE may be configured, in a given subframe, to decode either the USS or the CSS, but not both. Portions of the PDCCH data outside the prioritized portion may not be decoded, thereby abbreviating the decoding operation.

In particular, the LC UE may be configured to decode the prioritized portion when the UE is in connected mode. This configuration of LC UEs is in contrast to legacy UEs which are configured to decode both USS and CSS when in connected mode. For further clarity, "connected mode" may refer to a mode in which dedicated communications resources can be assigned to a UE, in contrast with an Idle mode in which this is not possible. For example, in the Idle mode, the UE may be configured substantially only to select an eNB and monitor for a paging message directed to it. In some embodiments, the connected mode may correspond to the UE being in an Evolved Packet Service (EPS) Connection Management (ECM) connected state, a Radio Resource Control (RRC) connected state, or the like.

It is also noted that, when the UE is not in connected mode, e.g. in idle mode, it is typically configured to only decode CSS but not USS. Thus, some of the issues noted below do not arise in idle mode.

Figure 1:
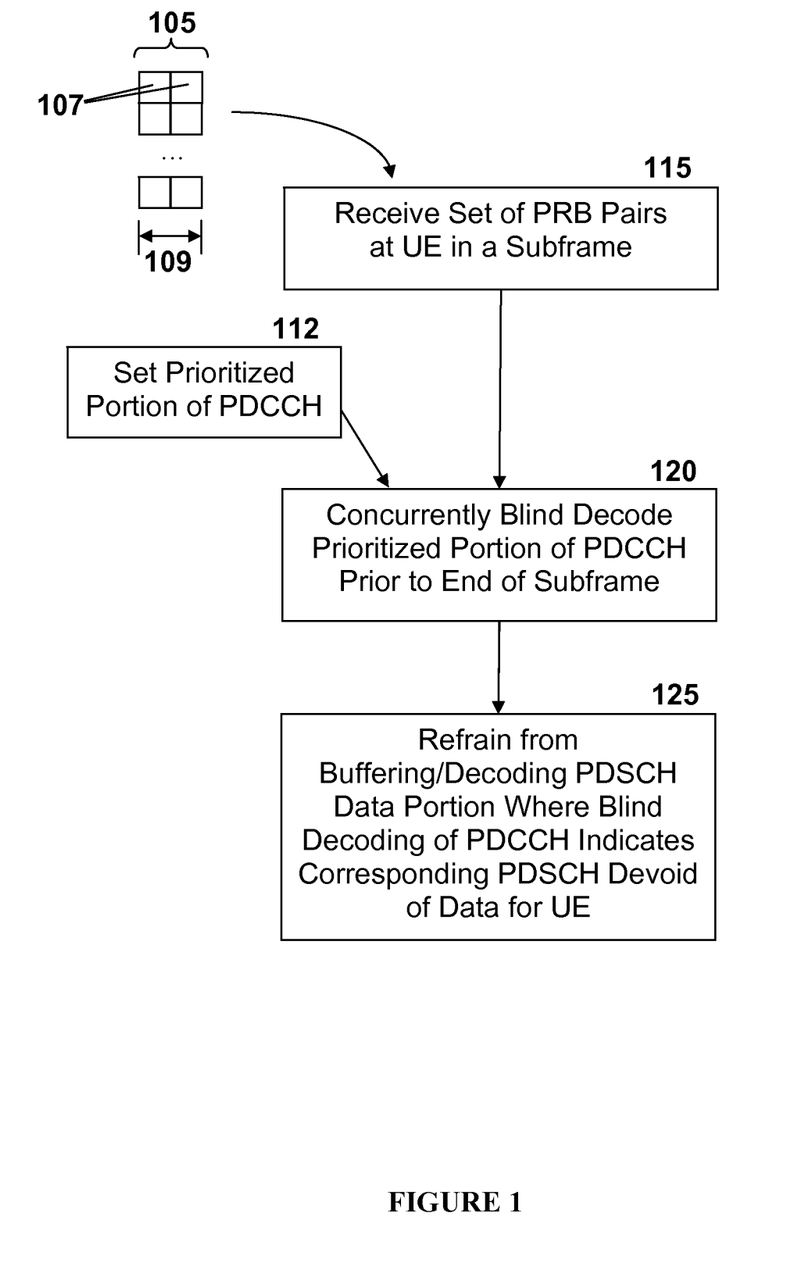
FIG. 1 illustrates a method of supporting LTE downlink communication, including PDCCH prioritization, in accordance with one embodiment of the invention.

FIG. 1 illustrates a method of supporting LTE downlink communication, including PDCCH prioritization, in accordance with one embodiment of the invention. As illustrated, a set 105 of Physical Resource Block (PRB) pairs are received 115 at a UE. Each PRB pair, such as PRB pair 107, of the set of PRB pairs 105 comprises PDCCH data followed by PDSCH data. Each PRB pair of the set of PRB pairs is transmitted concurrently within a subframe 109. Concurrently with receipt of said set of PRB pairs, blind decoding of a prioritized portion of the PDCCH data of PRB pairs of the set of PRB pairs is performed 120. Preferably, the blind decoding is completed prior to expiry of the subframe. Subsequently, and also preferably concurrently with receipt of said set of PRB pairs, for at least some PRB pairs for which the decoded PDCCH data thereof is indicative that the PDSCH data of the same subframe is devoid of data intended for the UE, the method comprises refraining 125 from one or both of buffering and decoding of at least some of the PDSCH data. The method may further comprise setting 112 the prioritized portion of the PDCCH data, for example to correspond to either the USS or CSS portion. This may be done dynamically and in a timely manner, for example to set the prioritized portion as the CSS portion in order to facilitate capturing data such as P-RNTI and SIB data as described elsewhere herein.

Figure 2:
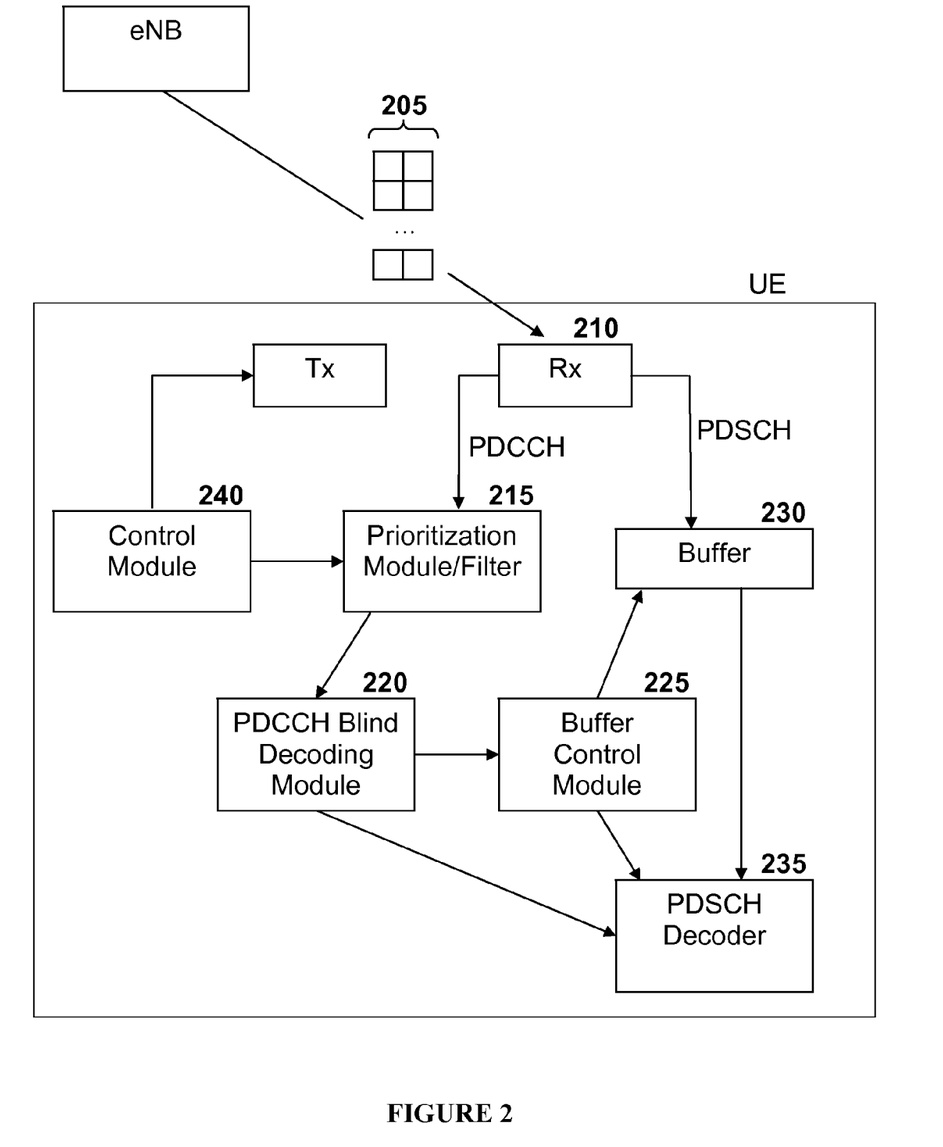
FIG. 2 illustrates an apparatus including downlink communication support and PDCCH prioritization capabilities, in accordance with one embodiment of the invention.

FIG. 2 illustrates an apparatus, such as a UE, including downlink communication support and PDCCH prioritization capabilities, in accordance with one embodiment of the invention. The apparatus includes a receiver module 210 configured to wirelessly receive a set 205 of Physical Resource Block (PRB) pairs from a base station. Each PRB pair of the set of PRB pairs comprises PDCCH data followed by PDSCH data, each PRB pair of the set of PRB pairs having been transmitted concurrently within a subframe. The apparatus further includes a buffer 230 for the PDSCH data of the PRB pairs, which is filled as the PDSCH data is received. The apparatus further includes a prioritization module 215 configured to select a prioritized portion of the PDCCH data of PRB pairs of the set of PRB pairs. In some embodiments, the prioritization module may be regarded as a prioritization filter configured to pass only the prioritized portions of the PDCCH data. The apparatus further includes a blind decoding module 220 configured to perform blind decoding of the prioritized portion of the PDCCH data of PRB pairs of the set of PRB pairs. Such blind decoding is generally performed concurrently with receipt of said set of PRB pairs and completed prior to expiry of the subframe. The apparatus further includes a buffer control module 225 configured, for at least some PRB pairs for which the decoded PDCCH data thereof is indicative that the PDSCH data of the same subframe is devoid of data intended for the UE, to inhibit one or both of buffering and decoding of at least some of said PDSCH data. The apparatus further includes a PDSCH decoder 235 which is configured to decode the remaining PDSCH data for which buffering and/or decoding has not been inhibited. The apparatus further comprises a control module 240 which may be configured, for example, to dynamically select the current prioritized portion of the PDCCH data, such as either the USS or CSS portion. For example the control module may be configured to select, in a timely manner, the CSS portion in order to facilitate capturing data such as the Paging Radio Network Temporary Identifier (P-RNTI) and System Information Block (SIB) data as described elsewhere herein.

In various embodiments, blind decoding of a portion of the PDCCH data is performed concurrently with receipt of the PRB pairs containing same. Thus, decoding of the PDCCH data may begin substantially immediately upon receipt and be completed prior to the end of the subframe in which the PRB pairs are communicated. The PDCCH data may be stored temporarily in a buffer for such purposes. Similarly, identifying PDSCH data portions which are devoid of data intended for the UE, and refraining from buffering such PDSCH data and/or discarding such PDSCH data already buffered, is performed concurrently with receipt of the PRB pairs insofar as this is performed before the end of the subframe.

In some embodiments, a LC UE may be configured to decode the USS rather than the CSS as often as possible. However, this may result in the UE missing certain important data such as PDCCH Downlink Control Information (DCI) messages and SIB updates. For example, DCI messages such as System Information Radio Network Temporary Identifier (SI-RNTI), Random Access Radio Network Temporary Identifier (RA-RNTI) and P-RNTI may be missed. Of these, missing SI-RNTI may not be regarded as an issue unless the UE is required to update SIBs due to expiry of a three-hour timer. Further, missing RA-RNTI may not be regarded as an issue when the UE is in connected mode, since in this case no Random Access Response (RAR) messages are expected.

In some embodiments, the prioritized portion may be fixed at certain size, while the size of the PDCCH is potentially variable with the system bandwidth. In such cases, if the PDCCH data size is less than the prioritized portion size, all of the PDCCH data may be potentially decoded. As the PDCCH data size grows larger than the prioritized portion size, the UE may refrain from decoding non-prioritized portions of the PDCCH data. In some embodiments, the LC UE buffer size is fixed, and PDCCH Control Channel Elements (CCEs) are received until the buffer is filled, with some CCEs being prioritized over others, for example USS CCEs being prioritized over CSS CCEs. In some embodiments, blind decoding may be performed on all buffered elements if the number of CCEs is small enough. In other embodiments, blind decoding may be performed on only a portion of the buffered elements. Received and decoded information is then delivered for further use.

However, missing P-RNTI may be an issue since this may indicate that SIBs have changed, thus requiring the UE to update its current SIB data. Embodiments of the present invention may be configured to resolve this issue using one or a combination of the following approaches.

First, it is noted the eNB may be already configured to transmit the P-RNTI multiple times, for example to support UEs in Discontinuous Reception (DRX) mode. A LC UE may therefore be configured to intermittently decode CSS in order to acquire the P-RNTI. For example, this may occur every 2.5 seconds or at the period of the longest DRX cycle supported by the system. Furthermore, since the subframe (SF) containing the P-RNTI data is known a priori as specified for example in 3GPP TS 36.304, "3rd Generation Partnership Project; Technical Specification Group Radio Access Network; Evolved Universal Terrestrial Radio Access (E-UTRA); User Equipment (UE) procedures in idle mode (Release 11)," V11.6.0, December, 2013, the UE may be configured to decode CSS substantially only for such subframes. Therefore, for example, a LC UE may only be required to decode CSS for one SF about every 2.5 seconds. Since this is a relatively small proportion of time, the probability of missing messages scheduled via USS whilst decoding CSS is low, and the loss may be recovered via other mechanisms, for example re-sending data by the eNB upon detecting a lack of response from the UE.

In some embodiments, therefore, the UE may be configured to acquire P-RNTI data by decoding the CSS portion of the PDCCH at a period corresponding to a longest DRX cycle supported by the LTE wireless communication system. In some embodiments, the eNB may be configured to transmit P-RNTI data periodically at times related to a UE's DRX cycle. The transmission times may be such that said P-RNTI data is transmitted via subframes during which the UE is anticipated to be decoding CSS in accordance with its DRX cycle. Thus, the eNB may transmit P-RNTI often enough that the UE will receive it when it wakes up briefly within the DRX cycle.

Second, a new P-RNTI flag message (LC-P-RNTI) may be created and scheduled in the USS's of all LC UEs. This message may be transmitted one subframe (SF) before the existing P-RNTI. A LC UE may be configured, upon receipt of the LC-P-RNTI, to decode CSS the next SF in order to receive the P-RNTI message. Since the LC-P-RNTI is unknown to legacy UEs they would be expected to ignore it.

Third, an Early Paging Indication (EPI) mechanism may be provided outside the PDCCH. The EPI may be transmitted to LC UEs to indicate an upcoming PDCCH which contains P-RNTI. In response, the LC UEs may be configured to decode CSS for said PDCCH.

Fourth, the eNB may be configured to avoid scheduling USS transmissions for receipt by a LC UE in subframes in which the UE is expected to be monitoring CSS rather than USS, for example in order to receive a P-RNTI message. Such subframes may be known to the eNB as they are defined by the standard or inferable from known operation of the UE, for example in accordance with one of the other solutions above. Thus, the LC UE will not miss messages via USS.

For clarity, it is noted that, as will be readily understood by a worker skilled in the art, the PDCCH generally conveys scheduling information, for example in the USS thereof, which informs a UE where in the PDSCH the corresponding payload data is to be found. Therefore, where reference is made herein to the PDCCH or portion thereof used in the communication or facilitating communication of content, it is understood that this may generally relate to the use of the PDCCH in its scheduling capacity, as is currently standard in LTE.

Fifth, if a USS message is being transmitted to a LC UE during the same subframe that a P-RNTI message is being broadcast to indicate a change in SIB data, then the eNB may be configured to set a flag in the corresponding USS, indicative that the LC UE should subsequently update its stored SIB information. The LC UE may be configured, in response, to monitor for and receiving SIB data in a timely manner.

Current LTE standards require that a UE must refresh, e.g. re-acquire, all SIBs periodically, for example at least every 3 hours as specified in Section 5.2.2.3 of 3GPP TS 36.331 "3rd Generation Partnership Project; Technical Specification Group Radio Access Network; Evolved Universal Terrestrial Radio Access (E-UTRA); Radio Resource Control (RRC); Protocol specification (Release 12)," V12.0.0, December 2013. If the UE is not in connected mode, it may be decoding CSS rather than USS, and hence refreshing SIBs is straightforward. However, if the UE is in connected mode and further configured to decode USS rather than CSS for an extended period, then it may be required to specifically create a SIB refresh opportunity.

In various embodiments, since the subframe containing SIB1 is known a priori, (e.g. every other SF#5), a LC UE may know exactly when to adjust the prioritized portion of the PDCCH, e.g. to switch from decoding CSS to decoding USS. Thus, it is only required to miss decoding one SF of USS in order to receive SIB1. However, the precise SF containing other SIBs is not known a priori, only an SI window, which is typically greater than about 20 SF as specified by the standard. This may be considered problematic since the LC UE would typically have to monitor the CSS for up to an entire SI window's worth of subframes in order to successfully receive SIB data pertaining to SIBs other than SIB1. As monitoring USS may be necessarily suspended during this time, loss probability for messages transmitted via USS may be relatively high unless this issue is addressed, for example as described below.

As a first solution, the UE may be configured to indicate to the eNB via signaling, such as Radio Link Control (RLC) level signaling, the periods of time when the UE is refreshing SIB information. For example, the UE may signal that a SIB information refresh is commencing and subsequently that it is completed. In response, the eNB may be configured to avoid scheduling user plane messages to this UE during the SI window SFs until the SIB information being refreshed by the UE has been sent. In some embodiments, the SIB refresh time may also be extended for LC UEs to reduce RLC signaling. Since the UE is in connected mode, the overhead to send a signalling message every 3 hrs is relatively small. This approach may also be useful for semi-static or pre-defined solutions. For example, rather than using the PDCCH for scheduling, some data may be assigned a pre-defined location in the PDSCH which is known a priori to the UE. As another example, the PDCCH of one subframe may be used to indicate PDSCH allocations in one or more subsequent subframes, thereby allowing for more time to decode the PDCCH before there is a need to buffer the PDSCH data. As such, this presently-described first solution may be an aspect of the present invention which is implemented independently of other aspects of the invention as described herein. For example, some aspects of the present invention may provide for a UE which is configured to communicate with its connected eNB to advise when the UE is and/or is anticipated to be unreceptive of USS data because the UE is monitoring SCC rather than USS, for example in order to receive SIBs as indicated by SI-RNTI in CSS. The eNB responds by refraining from scheduling via USS during the indicated subframes during which the UE is and/or is anticipated to be unreceptive. Additionally or alternatively this aspect may be used in conjunction with at least some other aspects of the invention as described herein.

In some embodiments, for example to reduce the amount of signaling described above, a UE may be configured having a SIB update window (e.g. 30 min) in which the UE can wait to naturally enter its idle mode, rather than attempting to update SIB information while in connected mode. That is, if the SIB refresh timer expires while the UE is connected, the UE does not immediately trigger actions to update SIB information but rather waits for a potential shift to idle mode during the update window. If the update window expires without the UE having shifted to idle mode, an explicit operation to update SIB information can then be executed upon expiry of the update window. On the other hand, if the UE shifts to idle mode during the update window time, SIB refresh operations can be simplified, since in the idle mode the UE typically ceases to monitor USS and instead monitors CSS and may more easily obtain SIB information without potentially missing receipt of user plane data, which is not expected during idle mode.

As another solution, SIB refresh may be explicitly requested by a UE via signaling, such as RLC signaling, and in response to the request the eNB may transmit the SIB information also via such signaling. In some embodiments, this approach can be adapted so that the UE indicates the last location and time SIB information was acquired, and the eNB then only transmits changes to the SIB information relative to that last acquisition, thereby reducing the amount of data to be transmitted. The use of an update window as described above may also be applied to this solution, for example so that a UE may be configured to wait until expiry of the update window before explicitly requesting a SIB refresh.

In relation to the above and in some embodiments, the UE may be configured to explicitly request that the eNB transmits a user plane message to the UE, the user plane message containing one or more portions of requested SIB information. The user plane message is scheduled via USS which the UE monitors. For example, the UE may request transmission of the user plane message in a given subframe window, and then monitor USS for that subframe window. The eNB essentially transmits a private message to the UE which includes the requested SIB information.

As yet another solution, transmission scheduling for SIBs may be restricted by the eNB in a manner which is known to the UE, for example a LC UE. For example, the SI window size may be reduced for one or more SIBs, thereby reducing the time required for a UE to monitor CSS rather than USS. In one embodiment the SI window size may be reduced to one. In some further embodiments, the eNB may be configured to refrain from scheduling USS messages for the UE during the reduced SI window.

In a further embodiment, SIB scheduling may be restricted to a predetermined pattern known to both the eNB and UE. For example, transmission of SIBs may be restricted to every other SF (e.g. sent only on odd SFs). In this case the UE may be configured to monitor CSS synchronously with the pattern during the SI window. This approach may allow eNB scheduling flexibility while also reducing latency of both SIBs or user plane messages. User plane throughput may however be reduced during the SI window period.

Reduced Set of Options for Encoding and Decoding

As already mentioned, aspects of the present invention relate to abbreviating blind decoding, for example as performed by a LC UE, by encoding at least some PDCCH data, such as data in the USS and possibly CSS, using a reduced set of encoding options. This may reduce the time during which PDSCH data is required to be buffered (before discarding irrelevant PDSCH data for example), and hence may reduce the amount of buffer memory required for the LC UE.

As will be readily understood by a worker skilled in the art, LTE UEs are typically configured to perform blind decoding of the PDCCH payload, since they are not a priori aware of the detailed control channel structure. Blind decoding includes, in part, attempts by the UE to decode PDCCH data under a series of assumptions, such as assumptions regarding the Aggregation Level (AL), the DCI format used, and the like. If decoding is unsuccessful for a given assumption, then another assumption is used and the decoding attempt is repeated. In various embodiments, decoding may be performed serially, in parallel, or a combination thereof. Parallel decoding may be employed for example given sufficient processing power and suitable structures of the different formats to be decoded.

For example, a LTE UE operating in accordance with the Release 8 or 9 standard is required to carry out up to 44 blind decodes in any subframe, as specified for example in 3GPP TR 36.213, tables 7.1-1 to 7.1-3 and 9.1.1-1. This is due to 12 blind decoding options in the Common Search Space and 32 blind decoding options in the User Search Space. The 12 blind decoding options in CSS are due to the presence of 4 candidates for Aggregation Level AL4, 2 candidates for AL8 and 2 possible DCI formats for each candidate. The 32 blind decoding options in USS are due to the presence 6 candidates for AL1, 6 candidates for AL2, 2 candidates for AL4, 2 candidates for AL8 and 2 possible DCI formats for each candidate.

In various embodiments, the number of blind decoding options is reduced for a LC UE using one or more of the following options.

A first option is to reduce the size and/or number of candidates in the Common Search Space (CSS). While the present invention recognizes this as a possibility, it is also recognized that this option may affect more than LC UEs, may be complicated to implement, and may therefore be avoided in various embodiments.

A second option is to reduce the size and/or number of candidates in the User Search Space (USS) for specific LC UEs. In some embodiments, lower Aggregation Levels, such as AL1 may be removed as candidates, thus preserving coverage, but possibly reducing spectral efficiency for LC UEs located close to the eNB. For example, removing the use of AL1 may remove 6 candidates from the USS, leaving 10 candidates.

A third option is to reduce the number of DCI options used in the USS. For example, only DCI Format 1A may be used, with DCI Format 1 being unused in USS transmissions to LC UEs. This would halve the number of USS candidates.

It is noted that the second and third options may be combined. For example, removing use of both AL1 and DCI Format 1 may yield a reduction in blind decoding option for USS from 32 to 10.

It is further noted that using a reduced set of options for blind decoding may be performed in combination with decoding a prioritized portion of the total search space (for example decoding either USS or CSS in a subframe but not both). It is even further noted that there may be little advantage to reducing the number of USS blind decoding options to less than the number of CSS blind decoding options, or vice-versa, since buffer memory size will be required to be sufficient to accommodate the greater number of options between these two.

In some embodiments, the eNB may be configured to identify particular LC UEs for which the number of encoding options is to be reduced, and to reduce encoding options for these UEs accordingly. This may be done on the basis of requests transmitted from such UEs, identifiers of the UEs themselves matching a certain known pattern, behaviour of the UEs, or the like.

Figure 3:
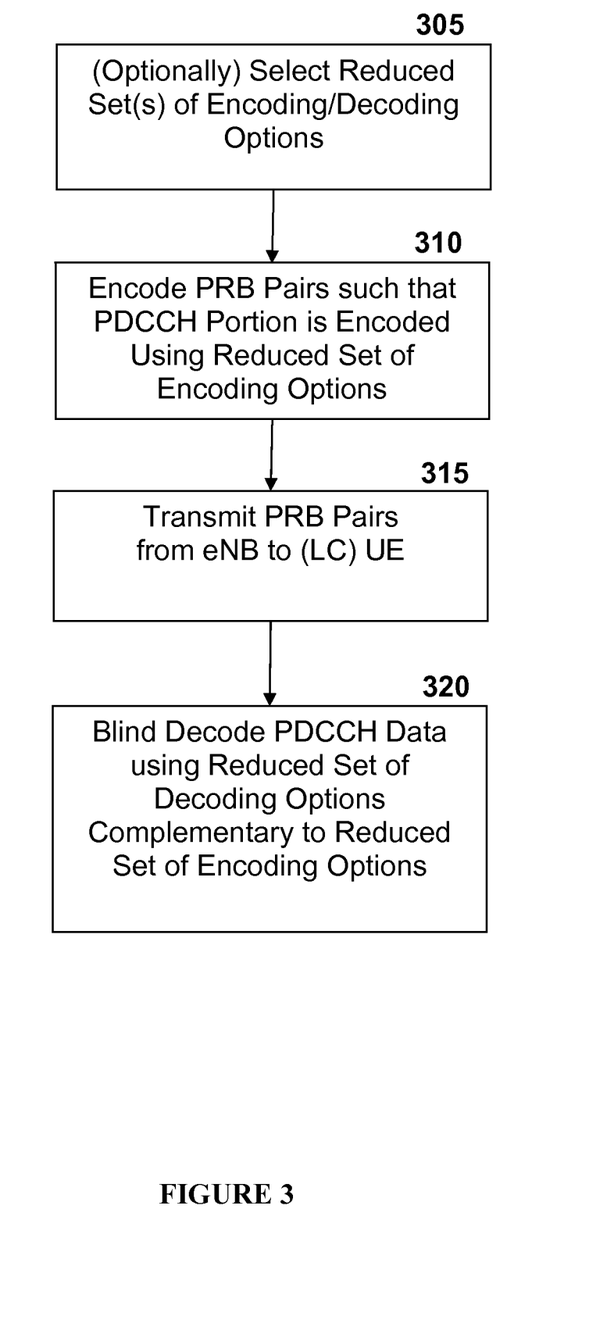
FIG. 3 illustrates a method of supporting LTE downlink communication, including use of a reduced set of PDCCH encoding and decoding options, in accordance with one embodiment of the invention.

FIG. 3 illustrates a method of supporting LTE downlink communication with a relatively reduced capability UE, in accordance with an embodiment of the invention. The method includes encoding 310 a set of Physical Resource Block (PRB) pairs for transmission in a common subframe and for receipt by a relatively reduced capability UE, such that at least a portion of the PDCCH data is encoded using a reduced set of encoding options relative to a full set of encoding options available for use in communication with relatively higher capability UEs. The method further includes transmitting 315 the set of PRB pairs from the eNB to the UE. The method further includes performing blind decoding 320, by the UE, of at least a portion of the PDCCH data of PRB pairs in the set of PRB pairs, wherein the blind decoding is limited to a reduced set of decoding options which is complementary to the reduced set of encoding options. The method optionally further includes selecting 305 the reduced set of encoding options and the reduced set of decoding options, for example dynamically and in a timely manner.

Figure 4:
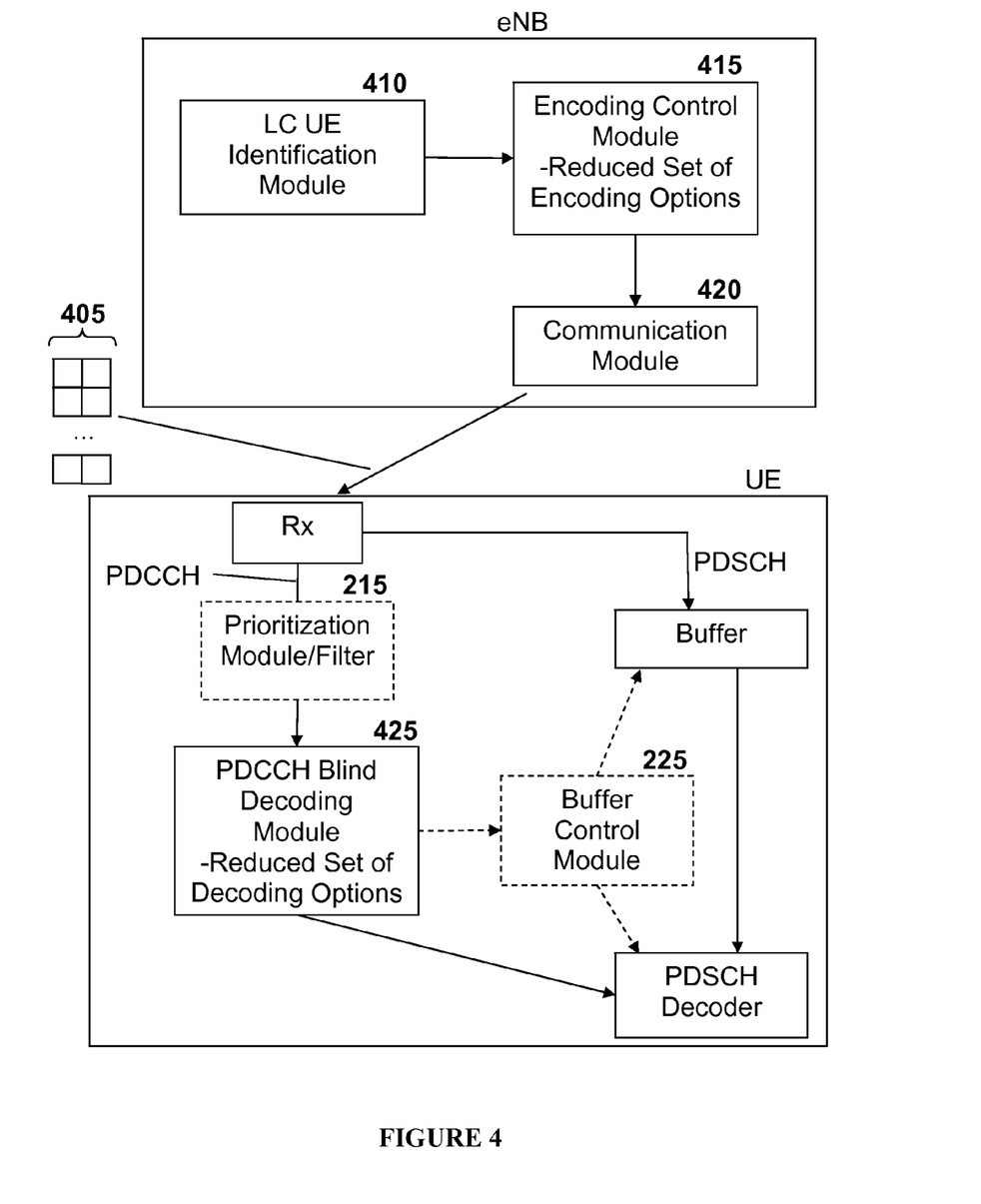
FIG. 4 illustrates an apparatus including downlink communication support and use of a reduced set of PDCCH encoding and decoding options, in accordance with one embodiment of the invention.

FIG. 4 illustrates a UE and a base station (eNB) configured for downlink communication support including use of a reduced set of PDCCH encoding and decoding options, in accordance with one embodiment of the invention. As illustrated, the base station includes an identification module 410 configured to identify one or a plurality of reduced capability UEs in communication with the base station. The base station further includes an encoding control module 415 configured to select a reduced set of encoding options relative to a full set of encoding options available for use in communication with relatively higher capability UEs. The base station further includes a communication module 420 configured to encode a set 405 of Physical Resource Block (PRB) pairs for wireless transmission by the base station for receipt by the reduced capability UE. Each PRB pair of the set of PRB pairs includes PDCCH data followed by PDSCH data, each PRB pair of the set of PRB pairs transmitted concurrently within a subframe, wherein at least a portion of the PDCCH data is encoded utilizes the reduced set of encoding options. The reduced capability (LC) UE in receipt of the PRB pairs comprises a blind decoding module 425 configured to perform blind decoding of at least a portion of the PDCCH data of PRB pairs in the set of PRB pairs. The blind decoding is limited to a reduced set of decoding options which is complementary to the reduced set of encoding options. The decoded PDCCH data may be used by a PDSCH decoder to decode buffered PDSCH data in a timely manner, and also in various embodiments to leverage abbreviated blind decoding as described below.

Also illustrated as an optional component is the prioritization module 215 as described with respect for example to FIG. 2. If this is included, in addition to the above, a prioritized portion of the PDCCH data may be decoded.

Also illustrated as an optional component is the buffer control module 225 as described with respect for example to FIG. 2, for inhibiting one or both of buffering and decoding of at least some of said PDSCH data. This may facilitate leveraging the abbreviated blind decoding to reduce buffer memory and/or computational requirements.

Leveraging Abbreviated Blind Decoding

An aspect of the present invention relates to the use of abbreviated blind decoding processes, as described above, in order to reduce buffer memory and/or computational requirements and thus reduce cost and complexity of certain classes of UEs, such as LC UEs. In particular, by a UE completing the blind decoding process on the PDCCH before the end of a subframe, information on which PRBs contain PDSCH data intended for that UE may be acquired more quickly. This information may be leveraged to reduce buffering of the PDSCH data following decoding of the PDCCH, since decoding of the PDCCH will also reveal which PRBs are devoid of data intended for the UE, and consequently that such PRBs can be ignored. A buffer control module as described elsewhere herein and/or related functionality may assist in this regard.

Additionally, in some embodiments, if a limited number of PRBs are used to support such a UE on the downlink, as is the case with proposed LC UEs, then the buffer size requirements for storing PDSCH data may be reduced. This is due to the fact that the UE will be guaranteed to be able to discontinue buffering all but a certain number of PRBs after the blind decoding process is completed.

In various embodiments, the more quickly the PDCCH can be decoded, the sooner the UE can cease buffering certain portions of the PDSCH in the same subframe. Prior to decoding of the PDCCH, the UE may be required to buffer all of the PDSCH. However, once the PDCCH is decoded, the buffered portions of the PDSCH which correspond to PRBs that are now known to not include data for the UE can be overwritten.

Figure 5:
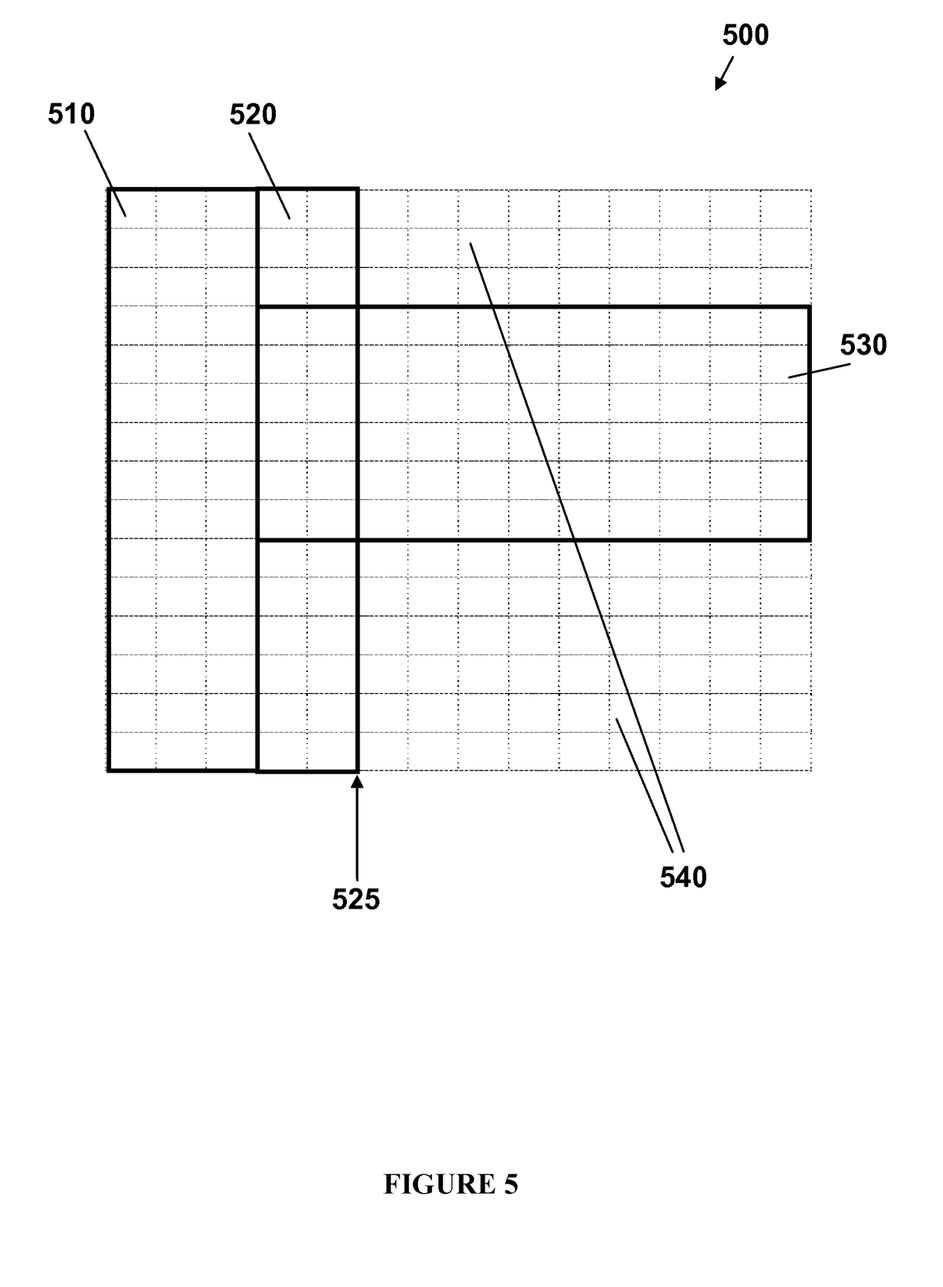
FIG. 5 illustrates operation including buffer requirement reduction in accordance with an embodiment of the present invention.

FIG. 5 illustrates an example of buffer requirement reduction in accordance with an embodiment of the present invention. Each row of the grid 500 represents one PRB pair as transmitted in a given 1 ms subframe. There may be, for example, between 6 and 110 PRB pairs in the grid although only a limited number are illustrated. Each column of the grid 500 represents one symbol interval of the subframe. Normal cyclic prefix mode is assumed so that there are 14 symbol intervals per subframe. Area 510 of the grid is occupied by the PDCCH data of the subframe. Time 525 corresponds to the time at which decoding of the PDCCH data is completed, via abbreviated PDCCH decoding. Area 520 represents PDSCH data which is buffered prior to time 525, noting that all data is buffered until this time since the meaningful PRB pairs have not yet been identified. Area 530 represents the PDSCH data which contains data intended for the UE, this area becoming apparent only at about time 525 due to the PDCCH decode. Area 540 represents the PDSCH data which is devoid of data intended for the UE, this area also becoming apparent at about time 525. In the present embodiment, buffering of data in area 540 is not performed by the UE, while buffering of area 530 is performed. Buffering of area 520 is also performed, however the buffered portion of area 520 that does not intersect with area 530 can be discarded or overwritten following time 525. It is noted that area 520 overlaps with both area 530 and area 540. In various embodiments, buffering of area 510 can also be discarded following time 525, if control channel data is no longer required. Hence, buffering requirements are reduced since area 540 does not need to be buffered. In one embodiment, in accordance with the above, the amount of buffer memory required corresponds to the greater of: the area 530; and the sum of the two areas 510 and 520.

It is noted that FIG. 5 illustrates a contiguous block of PRB pairs for clarity. However it is recognized that in practice the meaningful PRBs may be spread out in at least the frequency domain. For further clarity, as illustrated area 510 is 15 rows by 3 columns, area 520 is 15 rows by 2 columns, area 530 is 6 rows by 11 columns, and area 540 is formed of an upper rectangular region of 3 rows by 11 columns and a lower rectangular region of 6 rows by 11 columns.

In various embodiments, a reduced buffer memory size will save cost in the LC UE but may impose performance limits that legacy UEs do not have. In particular, for LC UEs the size of the block of data for buffering incoming downlink messages may be insufficient to allow reception of messages sent to all UEs (CSS) in the same subframe as messages addressed specifically to one UE (USS), depending on the size of the messages. In contrast, legacy UEs may have sufficient memory to receive both in the same subframe. Aspects of the present invention as described above may address the limitations associated with this limited memory size on reception of USS and CSS information in the PDCCH.

Method, Apparatus, System and Program Particulars

Some aspects of the present invention provide a method for operation of a wireless terminal in an LTE or similar system, generally referred to herein as a UE or in particular a LC UE. Other aspects provide a method for operation of a base station in an LTE or similar system, generally referred to herein as a eNB. Yet other aspects may provide a method for operation of both a wireless terminal and a base station communicatively coupled to the wireless terminal. In each case, various operations of the method may be performed by the wireless terminal or base station, for example by operating appropriate digital signal processing hardware which has been configured to perform these operations, or alternatively, if appropriate, by operating software or firmware on host hardware, such as a microprocessor operatively coupled to memory. As aspects of the present invention relate closely to physical signaling in the wireless system, specialized high-speed processing components may be preferred for executing these method operations. For example, such processing components may include one or more Application Specific Integrated Circuit (ASIC) chips specifically configured for use in LC UEs and facilitating operation in accordance with the present invention. Such chips may, for example, be designed and used to provide a trade-off of speed versus power consumption.

Various aspects of the present invention provide a wireless terminal in an LTE or similar system, a base station in an LTE or similar system, or a system comprising both a wireless terminal and a base station. Such components may comprise hardware components configured as described above. It is understood that wireless terminals and base stations may also be configured to support wireless communication generally in accordance with the appropriate standard, as would be readily understood by a worker skilled in the art.

Acts associated with the method described herein can be implemented as coded instructions in a computer program product. In other words, the computer program product is a computer-readable medium upon which software code is recorded to execute the method when the computer program product is loaded into memory and executed on the microprocessor of an associated computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method of supporting downlink communication in an LTE wireless communication system, comprising:
   wirelessly receiving a set of Physical Resource Block (PRB) pairs at a UE, each PRB pair of the set of PRB pairs comprising PDCCH data followed by PDSCH data, each PRB pair of the set of PRB pairs having been transmitted concurrently within a subframe;
   concurrently with receipt of said set of PRB pairs, performing blind decoding by the UE of a prioritized portion of the PDCCH data of PRB pairs of the set of PRB pairs, wherein said blind decoding is completed prior to reception of an end of the subframe; and
   for at least some PRB pairs for which the decoded PDCCH data thereof is indicative that the PDSCH data of the same subframe is devoid of data intended for the UE, refraining, by the UE, from one or both of buffering and decoding of at least some of said PDSCH data.

2. The method according to claim 1, further comprising determining whether the UE is in connected mode, wherein performing said blind decoding of the PDCCH data of each subframe when the UE is in connected mode comprises:
   selecting the prioritized portion of the PDCCH data as a strict subset of: a User Search Space (USS) portion of the PDCCH data in combination with a Common Search Space (CSS) portion of the PDCCH data; and
   performing blind decoding of only the prioritized portion.

3. The method according to claim 2, wherein the prioritized portion corresponds to either the entire USS portion or the entire CSS portion.

4. The method according to claim 2, wherein the prioritized portion is periodically selected to correspond to the entire CSS portion, thereby configuring the UE for receipt of predetermined information scheduled via the CSS portion.

5. The method according to claim 4, wherein the predetermined information comprises one or more of: P-RNTI and SIB data.

6. The method according to claim 4, further comprising transmitting a notification from the UE to a eNB serving the UE, the notification indicative of the subframe during which the prioritized portion is periodically selected to correspond to the entire CSS portion, and refraining, by the eNB, from scheduling transmissions to the UE via the USS portion which is received at the UE during said subframe.

7. The method according to claim 2, further comprising communicating to the UE, prior to the subframe, that a P-RNTI message will appear in the subframe, and monitoring, by the UE, the CSS portion during the subframe in order to facilitate reception of the P-RNTI message.

8. The method according to claim 2, further comprising communicating via the USS, that SIB information has been updated, said communication being triggered by the eNB transmitting both a P-RNTI message and USS data for receipt by the UE in the subframe.

9. The method according to claim 1, further comprising transmitting a request, from the UE to a eNB serving the UE, that the eNB transmit SIB refresh information during a subframe or subframe window indicated in the request, and transmitting, by the eNB, the requested SIB update information during the indicated subframe or subframe window.

10. The method according to claim 1, further comprising transmitting, from a eNB serving the UE and upon request by the UE, SIB information to the UE, the SIB information scheduled via a USS portion of the PDCCH.

11. The method according to claim 1, wherein the UE belongs to a subclass of UEs within a larger population of UEs, wherein the subclass of UEs exhibits relatively reduced capability in terms of one or both of: computational power and buffer memory size.

12. The method according to claim 11, further comprising defining a restricted SI window size for transmission of one or more SIBs other than SIB1 by an eNB for receipt by the UE, wherein the restricted SI window size is smaller than the corresponding default SI window size defined generally for the larger population of UEs.

13. The method according to claim 11, further comprising pre-defining a SIB update window known a priori to the UE and an eNB and transmitting SIB updates during said window, wherein the SIB update window is specific to the UE.

14. The method according to claim 1, wherein the UE is configured to acquire P-RNTI data by decoding CSS at a period corresponding to a longest DRX cycle supported by the LTE wireless communication system, wherein the eNB is configured to transmit P-RNTI data periodically at times related to a DRX cycle of the UE, said times being selected such that said P-RNTI data is transmitted via subframes during which the UE is anticipated to be decoding CSS in accordance with the DRX cycle.

15. The method according to claim 1, further comprising defining a SIB update time window for the UE, and upon expiry of SIB information, refreshing, by the UE, SIB information at the earlier of: expiry of the SIB update time window; and shifting of the UE from connected mode to idle mode.

16. The method of claim 1,
wherein at least a portion of the PDCCH data is encoded utilizing a reduced set of encoding options relative to a full set of encoding options available for use in communication with relatively higher capability UEs; and
wherein said blind decoding is limited to a reduced set of decoding options which is complementary to the reduced set of encoding options.

17. The method according to claim 16, wherein the portion of the PDCCH data is a User Search Space (USS) portion of the PDCCH data.

18. The method according to claim 16, wherein said reduced set of encoding options is defined by a reduced set of candidates for the User Search Space (USS), relative to a full set of candidates for the USS available for use in communication with the relatively higher capability UEs.

19. The method according to claim 16, wherein said reduced set of encoding options is defined by a reduced set of DCI formats for the User Search Space (USS), relative to a full set of DCI formats for the USS available for use in communication with the relatively higher capability UEs.

20. The method according to claim 1, further comprising:
notifying an eNB, by the UE via wireless communication, of one or more subframes during which the UE will be unreceptive of data scheduled via USS due to lack of monitoring of USS portions of PDCCH data of said one or more subframes; and
refraining, by the eNB, from scheduling data transmission via USS during the one or more subframes.

21. A wireless terminal device configured for communication in an LTE wireless communication system, comprising:
a receiver configured to wirelessly receive, from a base station, a set of Physical Resource Block (PRB) pairs, each PRB pair of the set of PRB pairs comprising PDCCH data followed by PDSCH data, each PRB pair of the set of PRB pairs having been transmitted concurrently within a subframe;
a prioritization filter configured to select a prioritized portion of the PDCCH data of PRB pairs of the set of PRB pairs;
a blind decoder configured, concurrently with receipt of said set of PRB pairs, to perform blind decoding of the prioritized portion of the PDCCH data of PRB pairs of the set of PRB pairs, wherein said blind decoding is completed prior to reception of an end of the subframe; and
a buffer controller configured, for at least some PRB pairs for which the decoded PDCCH data thereof is indicative that the PDSCH data of the same subframe is devoid of data intended for the UE, to inhibit one or both of buffering and decoding of at least some of said PDSCH data.

22. The wireless terminal device according to claim 21, wherein:
said blind decoding is limited to a reduced set of decoding options;
at least a portion of the PDCCH data is encoded by the base station utilizing a reduced set of encoding options relative to a full set of encoding options available for use in communication with relatively higher capability UEs; and
the reduced set of decoding options is complementary to the reduced set of encoding options.

23. A computer program product comprising a non-transitory computer readable medium comprising code that, when executed by a computer of a UE, is adapted to support downlink communication in an LTE wireless communication system by causing the UE to:
wirelessly receive a set of Physical Resource Block (PRB) pairs at a UE, each PRB pair of the set of PRB airs comprising PDCCH data followed by PDSCH data, each PRB pair of the set of PRB pairs having been transmitted concurrently within a subframe;
concurrently with receipt of said set of PRB pairs, perform blind decoding by the UE of a prioritized portion of the PDCCH data of PRB pairs of the set of PRB pairs, wherein said blind decoding is completed prior to reception of an end of the subframe; and
for at least some PRB pairs for which the decoded PDCCH data thereof is indicative that the PDSCH data of the same subframe is devoid of data intended for the UE, refrain, by the UE, from one or both of buffering and decoding of at least some of said PDSCH data.

* * * * *

UNITED STATES PATENT AND TRADEMARK OFFICE
CERTIFICATE OF CORRECTION

PATENT NO. : 9,681,256 B2
APPLICATION NO. : 14/214739
DATED : June 13, 2017
INVENTOR(S) : Gustav Gerald Vos et al.

Page 1 of 1

It is certified that error appears in the above-identified patent and that said Letters Patent is hereby corrected as shown below:

In the Claims

Column 18,
Line 30, "PRB airs," should read --PRB pairs--

Signed and Sealed this
Thirteenth Day of March, 2018

Andrei Iancu
*Director of the United States Patent and Trademark Office*